United States Patent
Choudhary et al.

(10) Patent No.: US 10,807,871 B2
(45) Date of Patent: Oct. 20, 2020

(54) PROCESS FOR PRODUCING GRAPHENE, A GRAPHENE AND A SUBSTRATE THEREOF

(71) Applicants: TATA STEEL LIMITED, Mumbai (IN); CENTRE FOR NANO AND SOFT MATTER SCIENCES, Bangalore (IN)

(72) Inventors: Shyam Kumar Choudhary, Mumbai (IN); Sumitesh Das, Mumbai (IN); Giridhar Udapi Rao Kulkarni, Bangalore (IN); Rajashekhar Pujar, Bangalore (IN)

(73) Assignees: TATA STEEL LIMITED, Mumbai (IN); CENTER FOR NANO AND SOFT MATTER SCIENCES, Bagalore (IN)

( * ) Notice: Subject to any disclaimer, the term of this patent is extended or adjusted under 35 U.S.C. 154(b) by 0 days.

(21) Appl. No.: 16/466,903

(22) PCT Filed: Jul. 21, 2017

(86) PCT No.: PCT/IB2017/054418
§ 371 (c)(1),
(2) Date: Jun. 5, 2019

(87) PCT Pub. No.: WO2018/104802
PCT Pub. Date: Jun. 14, 2018

(65) Prior Publication Data
US 2019/0352184 A1     Nov. 21, 2019

(30) Foreign Application Priority Data
Dec. 6, 2016 (IN) .............................. 201621041721

(51) Int. Cl.
*C01B 32/186* (2017.01)
*B82Y 30/00* (2011.01)
*B82Y 40/00* (2011.01)

(52) U.S. Cl.
CPC ............ *C01B 32/186* (2017.08); *B82Y 30/00* (2013.01); *B82Y 40/00* (2013.01)

(58) Field of Classification Search
CPC ................................................... C01B 32/186
(Continued)

(56) References Cited

FOREIGN PATENT DOCUMENTS

WO    2015040630 A1    3/2015
WO    WO-2015040630 A1 *    3/2015    ............. B05D 7/544

OTHER PUBLICATIONS

Prasai et al., "Graphene: Corrosion-Inhibiting Coating", ACS Nano 6(2): 1102-1108 (2012).
(Continued)

*Primary Examiner* — Brent T O'Hern
(74) *Attorney, Agent, or Firm* — Nixon Peabody LLP; David S. Resnick; Ravinderjit Braich (57) ABSTRACT

The present disclosure relates to a process for producing graphene, wherein the process is simple and economical. In the said process the substrate is contacted with vaporized seedlac to produce graphene on a substrate including but not limited to conductive material and non-conductive material. The disclosure further relates to a graphene which is impermeable to ions and molecules, resistant to oxidation and is hydrophobic. The disclosure furthermore relates to a substrate comprising graphene, said substrate is resistant to corrosion, resistant to oxidation and is hydrophobic.

14 Claims, 11 Drawing Sheets

(58) Field of Classification Search
USPC .......................................................... 428/220
See application file for complete search history.

(56) References Cited

OTHER PUBLICATIONS

Ruan et al., "Growth of graphene from food, insects, and waste", ACS Nano 5(9): 7601-7607 (2011).
Sun et al., "Growth of graphene from solid carbon sources", Nature 468: 549-552 (2010).

* cited by examiner

PROCESS FOR PRODUCING GRAPHENE, A GRAPHENE AND A SUBSTRATE THEREOF

CROSS-REFERENCE TO RELATED APPLICATIONS

This application is a 35 U.S.C. § 371 National Entry Application of International Application No. PCT/IB2017/054418 filed Jul. 21, 2017, and which claims benefit of IN 201621041721 filed Dec. 6, 2016, the contents of both of which are incorporated herein by reference in their entireties.

TECHNICAL FIELD

The present disclosure relates to graphene production. The disclosure mainly relates to a process for producing graphene by a carbon source such as seedlac vapour. The disclosure further relates to a graphene produced by the said process. The disclosure also relates to a substrate comprising said graphene.

BACKGROUND OF THE DISCLOSURE

Graphene is a monoatomic derivative of graphite which exhibits unusual electronic, mechanical, optical and thermal properties.

In spite of known valuable properties, commercialization of graphene based products is limited due to lack of simple production process. For instance, Chemical vapour deposition (CVD) is a most common process for production of graphene on a substrate with large surface coverage. However, CVD process is limited due to catalytic need for producing a graphene on a substrate such as nickel and copper at lower temperature. And, the process requires precise control on processing parameters, e.g. precursor, gas flow rate, substrate temperature and annealing time.

Other methodologies such as mechanical exfoliation, pyrolysis of solvothermal products and plasma treatment of a substrate coated with organic compounds are known for preparing graphene. However, the said methodologies have their own limitations such as production of graphene is limited to a particular substrate, requirement of controlled atmosphere etc., besides these methodologies for producing graphene are not economical.

In view of the above mentioned limitations/shortcomings in the processes available to prepare graphene, there is a need to develop a process devoid of such limitation/shortcomings.

SUMMARY OF THE DISCLOSURE

The present disclosure overcomes the limitation/shortcomings of the processes known for producing graphene until the priority date of this application.

Accordingly, the present disclosure relates to process for producing graphene, wherein said process comprises steps of:
  heating a substrate and at least one feeder;
  contacting vapours of seedlac with the substrate; and
  cooling the substrate to produce the graphene.

In another embodiment, the present disclosure relates to a graphene produced by the said process, wherein the said graphene is impermeable, resistant to oxidation and hydrophobic.

In another embodiment, the present disclosure relates to a substrate comprising the said graphene.

BRIEF DESCRIPTION OF THE ACCOMPANYING FIGURES

In order that the disclosure may be readily understood and put into practical effect, reference will now be made to exemplary embodiments as illustrated with reference to the accompanying figures. The figures together with detailed description below, are incorporated in and form part of the specification, and serve to further illustrate the embodiments and explain various principles and advantages, in accordance with the present disclosure where.

DETAILED DESCRIPTION

The process described in the present disclosure is a simple process to produce graphene having large area coverage on a substrate. The said process is commercially viable and overcomes the limitation and/or shortcomings associated with known processes available to produce graphene.

The present disclosure particularly relates to a process for producing graphene.

In a non-limiting embodiment, the present disclosure relates to a process for producing graphene from a carbon source such as seedlac, on a substrate including but not limited to conductive material and non-conductive material. In an alternate embodiment the substrate includes but is not limited to oxidized conductive material and oxidized non-conductive material.

In a non-limiting embodiment, the conductive material is selected from a group comprising, copper, nickel, aluminium, chromium, tungsten, bronze gold and alloy or any combinations thereof and wherein the alloy is selected from a group steel (SS 904), mild steel, Al—Zn alloy (Al 3003), Al—Si alloy (Al 4343), Cu—Ni and Ni—Cr, or any combinations thereof.

In another non-limiting embodiment, the non-conductive material is selected from a group comprising of glass and quartz, or a combination thereof.

In a non-limiting embodiment, the oxidized conductive material is selected from a group comprising zinc oxide, tin oxide and indium oxide, or any combinations thereof. In another non-limiting embodiment, the oxidized non-conductive material is selected from a group comprising quartz, glass, toughened glass, mica and ceramic, or any combinations thereof.

In an embodiment, the substrate is in a form selected from a group comprising sheet, wire, foil and mesh, or any combination thereof.

Figure 1:
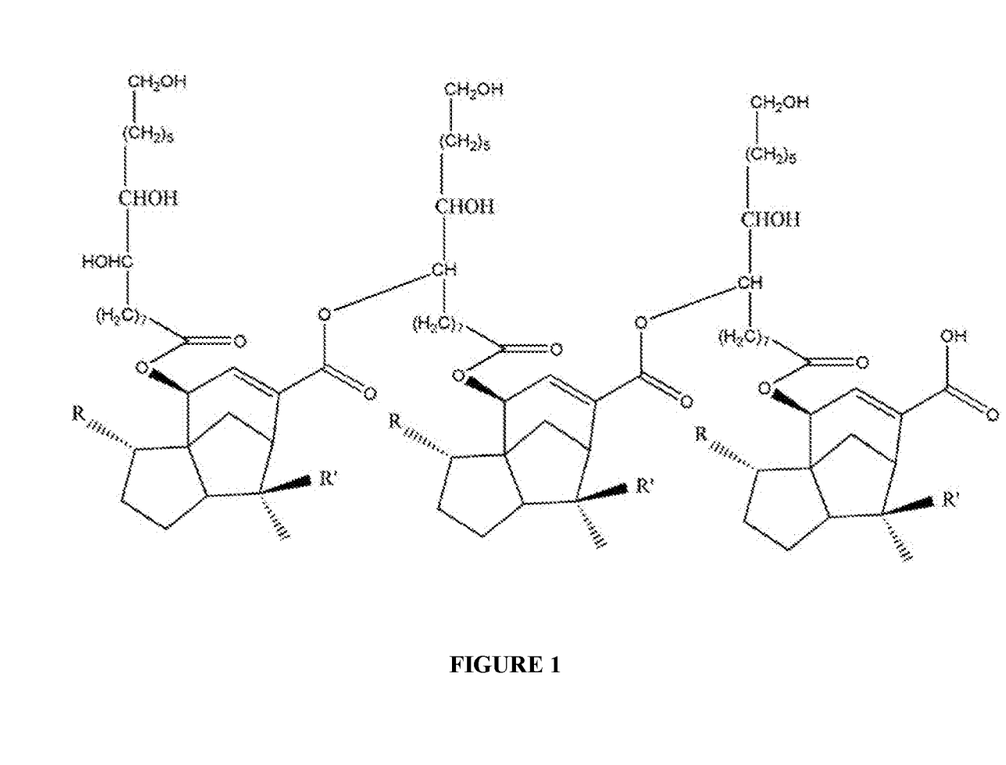
FIG. 1 illustrates chemical structure of seedlac.

In an embodiment, the carbon source such as seedlac is in a vapour form. FIG. 1 illustrates the chemical structure of seedlac containing cyclic six and five membered carbon rings with a long aliphatic chain attached to hydroxyl and acetate functional groups.

In an exemplary embodiment, the process of producing graphene comprises step of contacting the substrate with a carbon source such as seedlac, wherein the seedlac is in a vapour form. The seedlac in vapour form acts as a precursor for producing graphene.

In an embodiment, the seedlac is vaporized by heating the seedlac above its glass transition temperature ranging from about 300° C. to 500° C.

In an embodiment in the process of the present disclosure, the vaporized seedlac is transformed to graphene under optimized experimental conditions by bond rearrangement through removal of hydroxyl functional groups, thereby causing the production of large area graphene on substrates including but not limiting to conductive material and non-conductive material.

In an exemplary embodiment, the vaporized seedlac employed in the process of the present disclosure has the advantage of forming large area graphene without the limitation of requiring a specific substrate, unlike in the prior arts and is capable of forming graphene on any substrate including but not limiting to conductive material and non-conductive material.

In an exemplary embodiment, the process of producing graphene comprises the steps of:
  heating the substrate to a predetermined temperature;
  contacting the vapours of seedlac with the substrate;
  cooling the substrate, thereby producing graphene.

In an embodiment, the substrate is heated to a temperature ranging from about 400° C. to 1200° C. under vacuum at a pressure ranging from about $10^{-1}$ mbar to $10^{-5}$ mbar or at a controlled atmosphere comprising argon, combination of argon and hydrogen or combination of nitrogen and hydrogen, at a flow rate ranging from about 100 sccm to 500 sccm for a period ranging from about 1 minute to 120 minutes.

In another exemplary embodiment, the process of producing graphene comprises acts of:
  heating the substrate and at least one feeder
  contacting the vapours of seedlac with the substrate
  cooling the substrate to room temperature to produce graphene.

In an embodiment, the feeder is any material identical or different to substrate, wherein the feeder comprises seedlac solution.

The seedlac solution is seedlac in alcohol, wherein the alcohol is selected from a group comprising ethanol, isopropanol and tert-butyl alcohol, or any combinations thereof, wherein the concentration of seedlac is about 10 g to 200 g per litre of the alcohol.

In an exemplary embodiment, the seedlac solution is prepared by heating seedlac in the alcohol selected from a group comprising ethanol, isopropanol and tert-butyl alcohol, or any combinations thereof, to a temperature ranging from about 25° C. to 90° C., for a time period ranging from about 10 minutes to 60 minutes.

In an exemplary embodiment, the seedlac solution is casted on the feeder by a technique including but not limited to dipping and spin coating, followed by drying the feeder surface in air atmosphere for a time period ranging from about 1 minute to 10 minutes; thereafter which it is put into the furnace.

In an embodiment, the feeder is any material identical to the substrate, including but not limiting to conductive material and non-conductive material, having high melting point ranging from about 500° C. to 4000° C.

In an alternate embodiment, the feeder is any material different to the substrate, and having melting point ranging from about 300° C. to 4000° C.

In an embodiment, the substrate and the feeder comprising the seedlac, is heated to a temperature ranging from about 400° C. to 1200° C. under vacuum at pressure ranging from about $10^{-1}$ mbar to $10^{-5}$ mbar for a time period ranging from about 1 minute to 120 minutes, whereby the seedlac on the feeder is vaporized and the substrate is contacted with the seedlac. The heating is done in a furnace, wherein the furnace is any electronic heating furnace, capable of being heated to a predetermined temperature.

In an alternate embodiment, the substrate and the feeder comprising the seedlac, is heated to a temperature ranging from about 400° C. to 1200° C. under controlled atmosphere comprising argon, combination of argon and hydrogen or combination of nitrogen and hydrogen at a flow rate ranging from about 100 sccm to 500 sccm for a time period ranging from about 1 minute to 120 minutes, whereby the seedlac on the feeder is vaporized and the substrate is contacted with the seedlac.

In a non-limiting embodiment, the thickness of the Graphene is ranging from about 1 nm to 100 nm. Further, the thickness of the Graphene is dependent on the concentration of seedlac dosing. Hence, in order to obtain a Graphene of predetermined thickness, a predetermined amount of seedlac is required.

In an alternate non-limiting embodiment, the thickness of the Graphene is dependent on the concentration of seedlac dosing on the feeder by spin coating. Hence, in order to obtain a graphene of predetermined thickness, a predetermined amount of seedlac is to be applied on the feeder by spin coating.

In an exemplary embodiment, a system for producing graphene, said system comprising the components:
  substrate holder for holding substrate and at least one feeder;
  furnace for heating the substrate holder comprising substrate and at least one feeder; and
  cooling device to cool the substrate to room temperature to produce graphene.

In a non-limiting embodiment, the feeder is casted with a seedlac solution by a technique including but not limited to spin coating, followed by drying the feeder surface in air atmosphere for a period ranging from about 1 minute to 10 minutes. The seedlac solution is seedlac in alcohol selected from a group comprising ethanol, isopropanol and tert-butyl alcohol, or any combinations thereof, having concentration ranging from about 10 g to 200 g per litre of the alcohol.

In an embodiment, the substrate is any material including but not limited to conductive material and non-conductive material. In an alternate embodiment the substrate includes but not limited to oxidized conductive material and oxidized non-conductive material.

In an embodiment, the substrate holder is any platform that is capable of holding the substrate and at least one feeder at a predetermined distance.

In an embodiment, the furnace is any electronic heating furnace, capable of heating the platform to a predetermined temperature.

Figure 2:
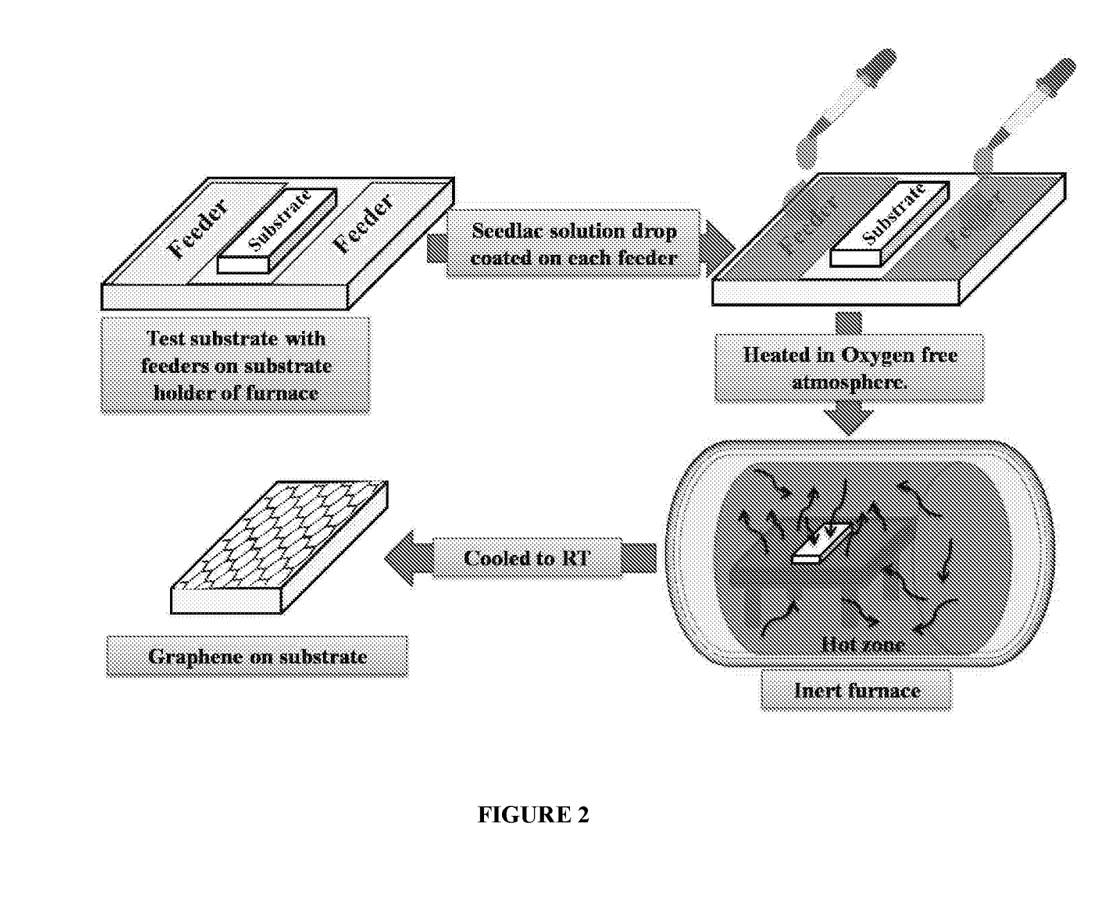
FIG. 2 illustrates experimental step up for graphene production on a substrate.

FIG. 2 exemplifies the experimental setup of graphene production by the process of present disclosure. The setup comprises a heating platform where the substrate is surrounded by at least one feeder coated with seedlac solution. The heating platform comprising the substrate and the at least one feeder coated with seedlac solution is placed in a heating furnace, whereby upon heating the furnace, the vapours of the seedlac is generated (seedlac is vaporized) and is deposited on the substrate, thereby forming graphene on the substrate upon cooling the substrate to a temperature ranging from about 20° C. to 40° C. (room temperature).

In an embodiment, the advantages of producing graphene by the process of the present disclosure are—
- the process is simple and is easily adapted to coat any substrate without any limitation, wherein the substrate is either conductive material or non-conductive material or both.
- the process does not employ any hazardous chemicals, hence is an environmental friendly process.
- the process does not employ pre-coating of precursor solution on a substrate, as solution based approach does not lead to large area graphenes. However, the instant process is able to produce large area graphene without any limitation.
- since there is no pre-coating of the substrate with the precursor solution in the process of the present disclosure, drying step is circumvented, unlike in the process of the prior art which requires specific drying step to dry the precursor solution coated substrate.
- the process of the instant disclosure can produce can graphene on the curved surfaces, unlike the processes known in the prior art.
- the process is commercially viable and economical, unlike the processes known in the prior art.
- the graphene can be produced in both vacuum and in the controlled atmosphere using inert gases, independently.

The present disclosure further relates to graphene produced by the process of the present disclosure.

In an embodiment, the graphene is impermeable, thereby causing the substrate having the said graphene to possess anti-corrosion property, wherein the substrate is any material including but not limited conductive material and non-conductive material.

In another embodiment, the graphene produced by the process of present disclosure is reduced graphene oxide, comprising oxygen content.

In a non-limiting embodiment, the conductive material is selected from a group comprising, copper, nickel, aluminium, chromium, tungsten, bronze gold, and alloy, or any combinations thereof and wherein the alloy is selected from a group comprising steel (SS 904), mild steel, Al—Zn alloy (Al 3003), Al—Si alloy (Al 4343), Cu—Ni and Ni—Cr, or any combinations thereof.

In an embodiment, the non-conductive material is selected from a group comprising glass and quartz, or a combination thereof.

Figure 3:
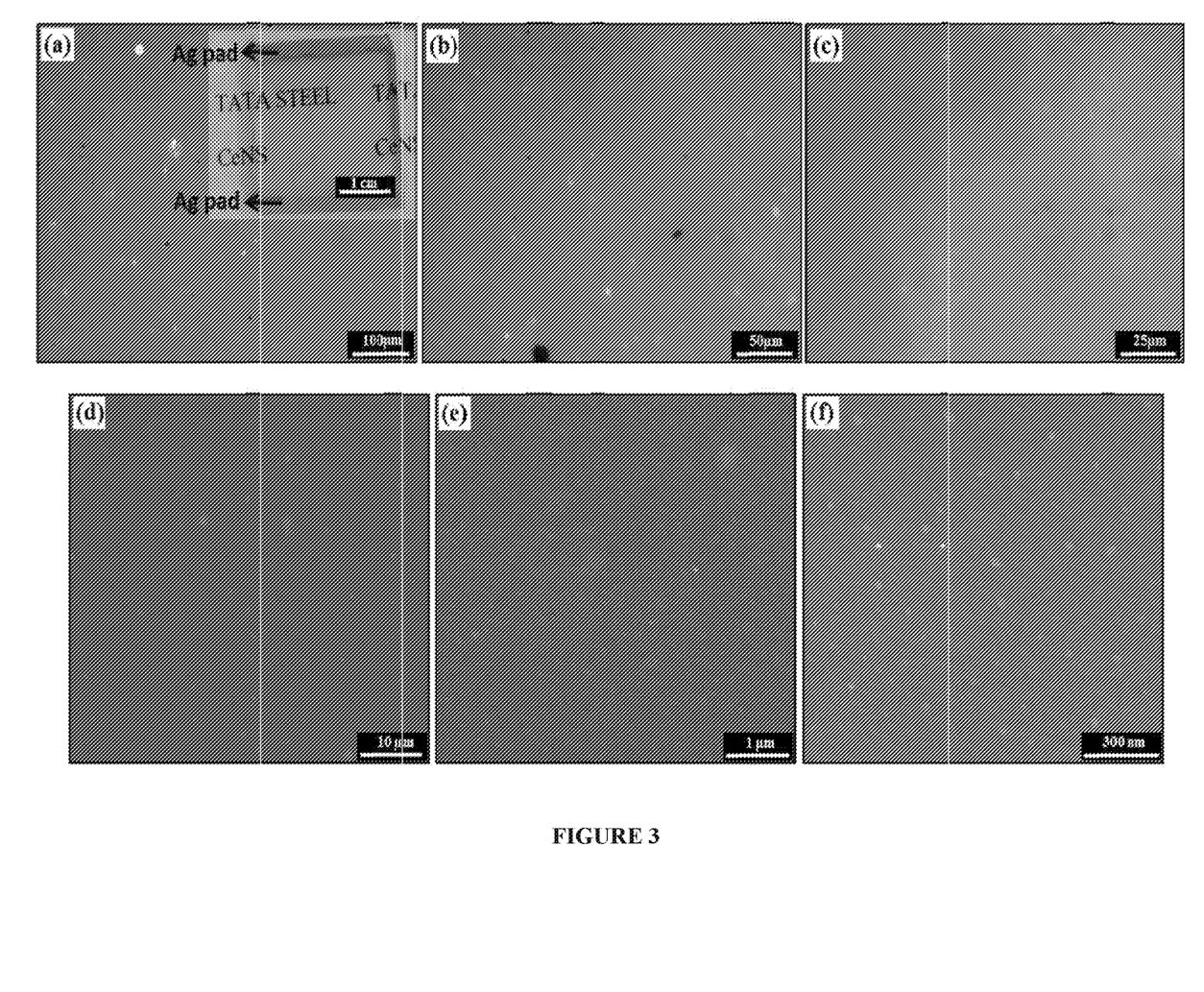
FIG. 3 illustrates a microscopic optical and scanning electron microscope (SEM) images with different magnifications of the graphene of any continuity.

In an embodiment, FIG. 3 exemplifies the microscopic images, wherein FIGS. 3a-3c exemplifies microscopic images with different magnifications. Inset of FIG. 3a shows digital optical image of the graphene. FIGS. 3d-3f exemplifies the SEM images of graphene. FIG. 3(f) demonstrates that the graphene is free from structural defects.

Figure 4:
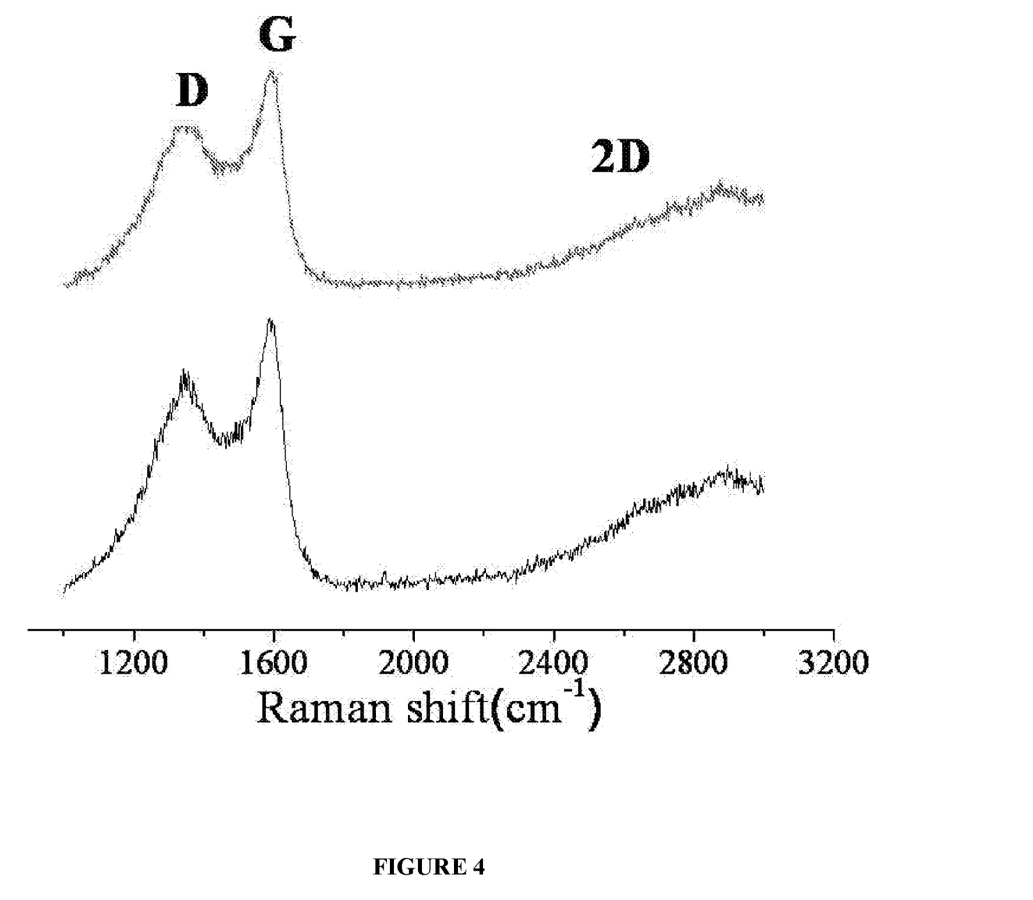
FIG. 4 illustrates Raman spectra of graphene at different regions of the said graphene.

In an embodiment, FIG. 4 exemplifies the Raman spectra of graphene at different regions on the surface said graphene. The spectra clearly shows the presence of G and broad 2D bands, which are primary indicators of graphene. The D band observed are defects, mainly arising from the edges of the finite domains, which are ascertained only after examination of its purity using XPS.

Figure 5:
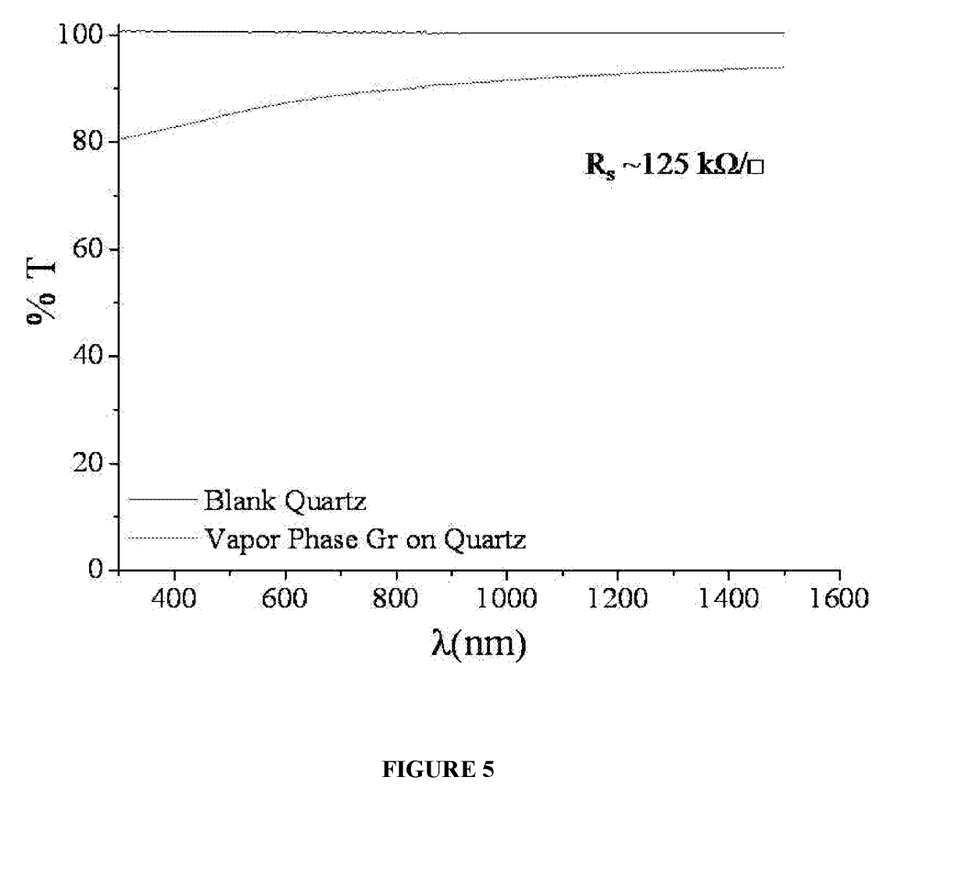
FIG. 5 illustrates transmission spectrum of graphene on a substrate and a bare substrate (without the said graphene), respectively.

In an embodiment, FIG. 5 exemplifies the transmission spectrum of graphene with the transmission of about 88% in the visible range. The graphene is conducting all over the region with $R_s$ of about 125 kΩ/sq.

Figure 6:
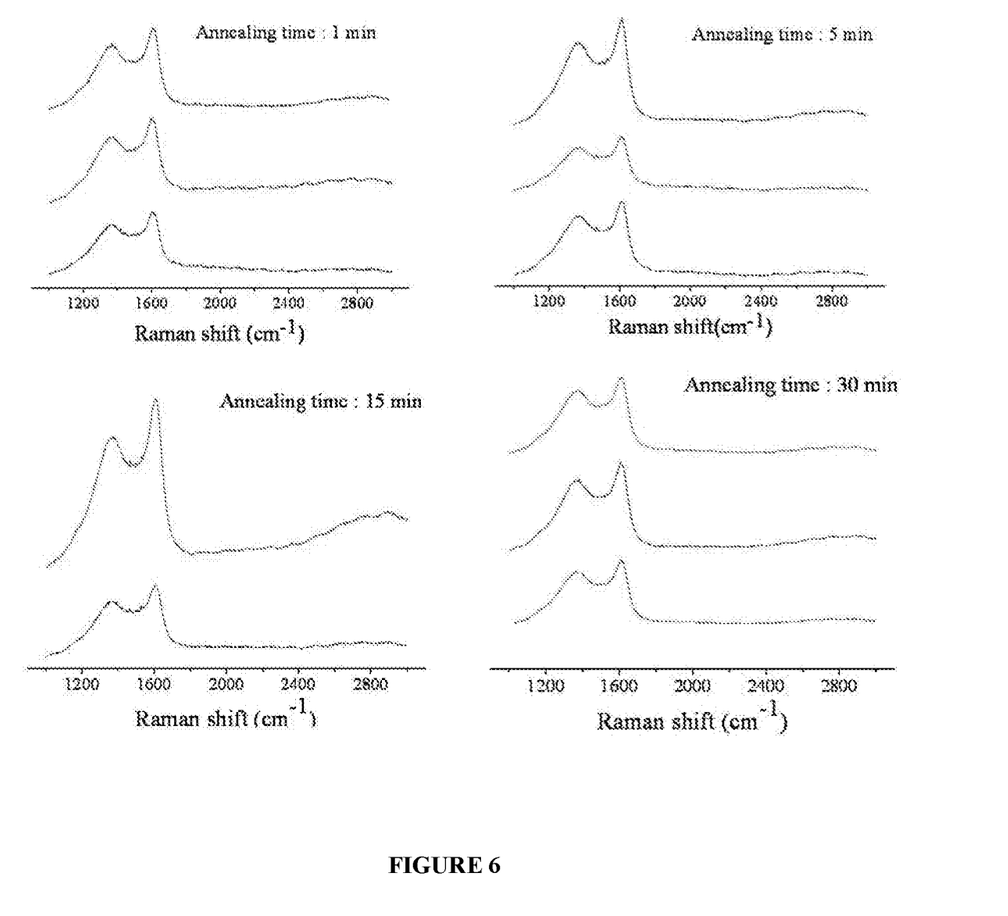
FIG. 6 illustrates Raman spectra of graphene at different regions of the said graphene at different annealing time.

In an embodiment, FIG. 6 exemplifies Raman spectra of graphene on Cu substrate, at different regions on the surface of the said graphene at an annealing temperature of about 780° C. FIGS. 6a-6d shows Raman spectra of graphene for annealing time of about 1 minute, about 5 minutes, about 15 minutes and about 30 minutes, respectively.

Figure 7:
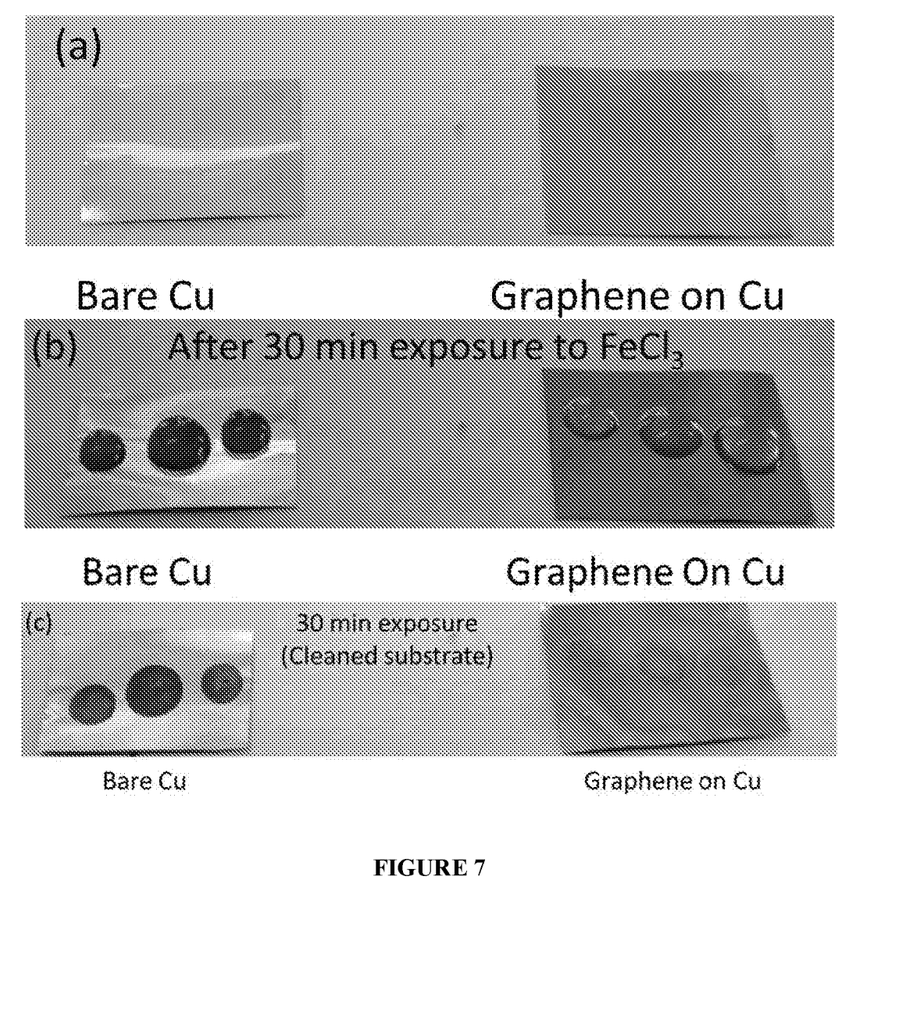
FIG. 7 illustrates ferric chloride exposure test conducted on the graphene and bare substrate (without the said graphene).
Figure 8:
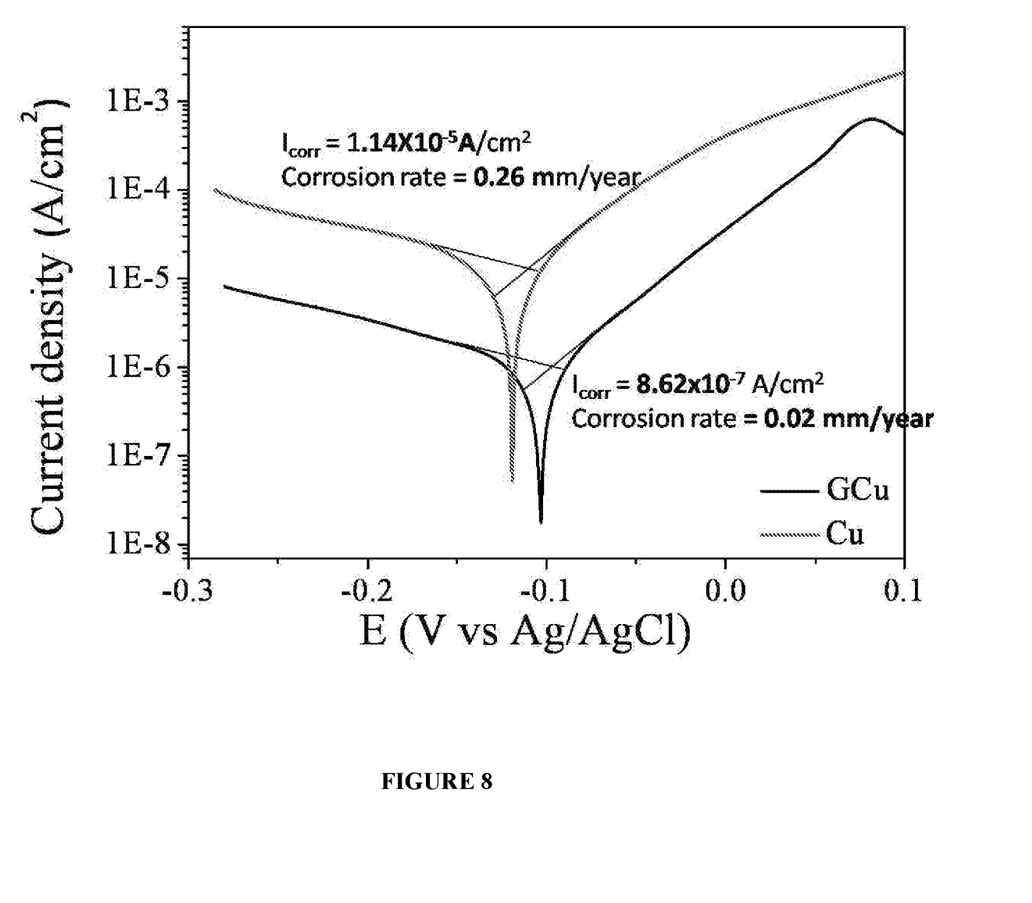
FIG. 8 illustrates electrochemical Tafel plot for graphene and bare substrate (without the said graphene), respectively.

In an embodiment, FIGS. 7 and 8 exemplify the impermeable property of the graphene of the present disclosure, thereby indicating the anti-corrosion property of a substrate coated with the said graphene.

FIG. 7 exemplifies the anti-corrosion property of the copper having (coated with) graphene, wherein the copper having graphene and bare copper are exposed to dilute ferric chloride solution, respectively for about 30 minutes. Immediately after exposure, bare copper starts corroding while copper having graphene is intact without any signs of corrosion, proving that the graphene is impermeable to ions and molecules, and the impermeability is such that even a smallest ion from etchants such as $FeCl_3$ (0.5 M) cannot pass through the graphene of the instant disclosure.

FIG. 8 further substantiates the anti-corrosion property imparted to the substrate by the graphene of the present disclosure. FIG. 8 exemplifies electrochemical Tafel measurement of bare copper and copper having (coated with) graphene, wherein the measurement is done with about 3.5% NaCl as electrolyte and Ag/AgCl reference electrode. Tafel result shows that the corrosion rate of the copper having Graphene of the present disclosure is 0.02 mm/year (Icorr=$8.62 \times 10^{-7}$ A/cm$^2$), whereas the corrosion rate of the bare copper is 0.26 mm/year (Icorr=$1.14 \times 10^{-5}$ A/cm$^2$), thereby demonstrating that the graphene significantly improves corrosion resistance of copper, again proving that the graphene is impermeable to ions and molecules. Icorr=Corrosion current, which signifies the resistance offered by the protective layer to any chemical molecule In another embodiment, the graphene is resistant to oxidation.

Figure 9:
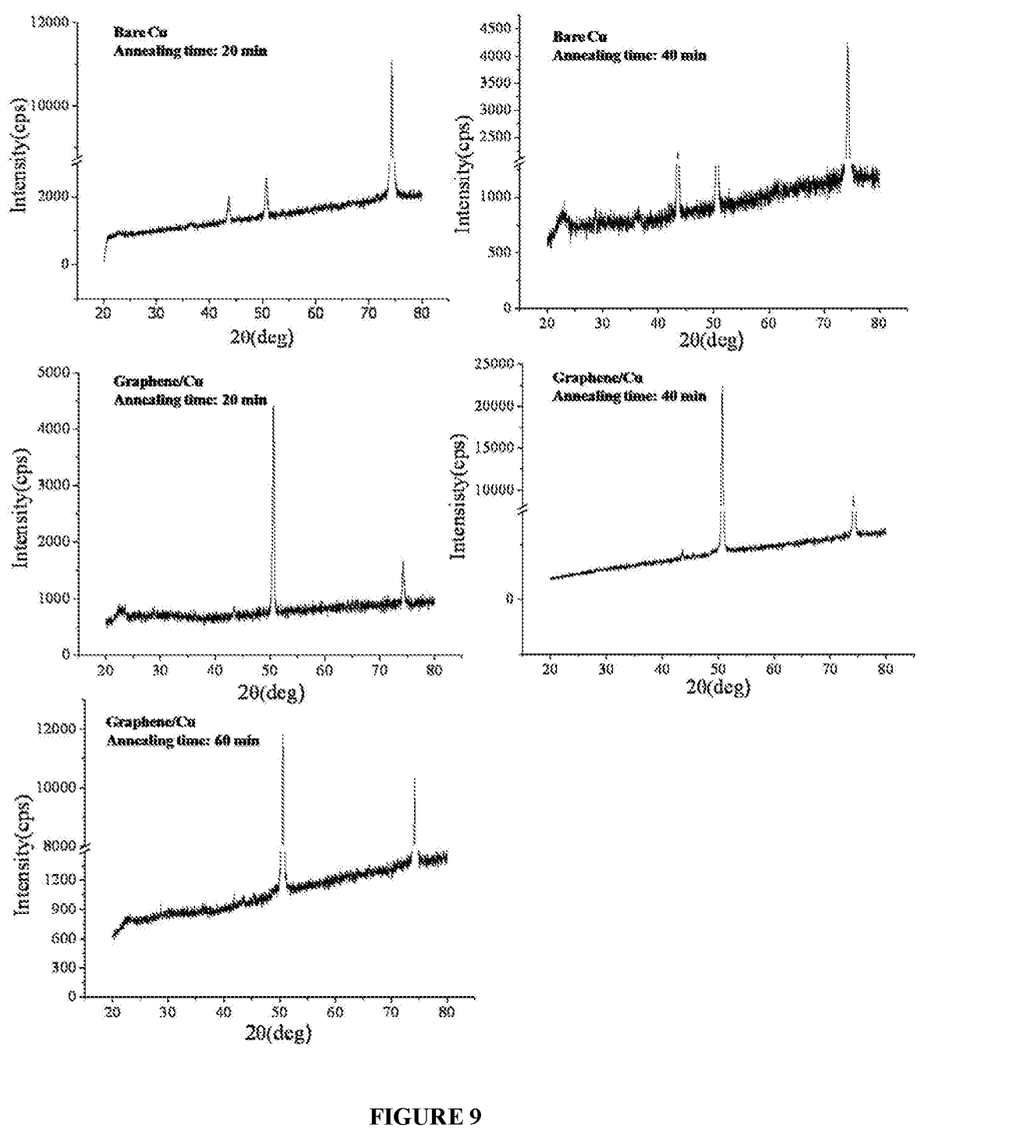
FIG. 9 illustrates XRD patterns of graphene on a substrate at an annealing temperature of about 250° C. in presence of air and bare substrate (without the said graphene), respectively at different time durations.

In an embodiment, FIG. 9 exemplifies the oxidation resistance to graphene, wherein XRD measurement of bare copper and copper having graphene, respectively is performed after annealing the bare copper and copper having graphene in air at a temperature of about 250° C. for different time duration such as 20 minutes, 40 minutes and 60 minutes, respectively. XRD pattern of bare copper clearly shows oxidation peak of CuO (002) whose intensity increases with increase in annealing time, while copper having Graphene do not show any sign of oxidation even after annealing for about 60 minutes. This peak appears within 20 minutes of annealing in case of Cu at 250° C. For Gr/Cu CuO (002) peak doesn't appear up to 60 min at 250° C.

In another embodiment, the graphene is hydrophobic.

Figure 10:
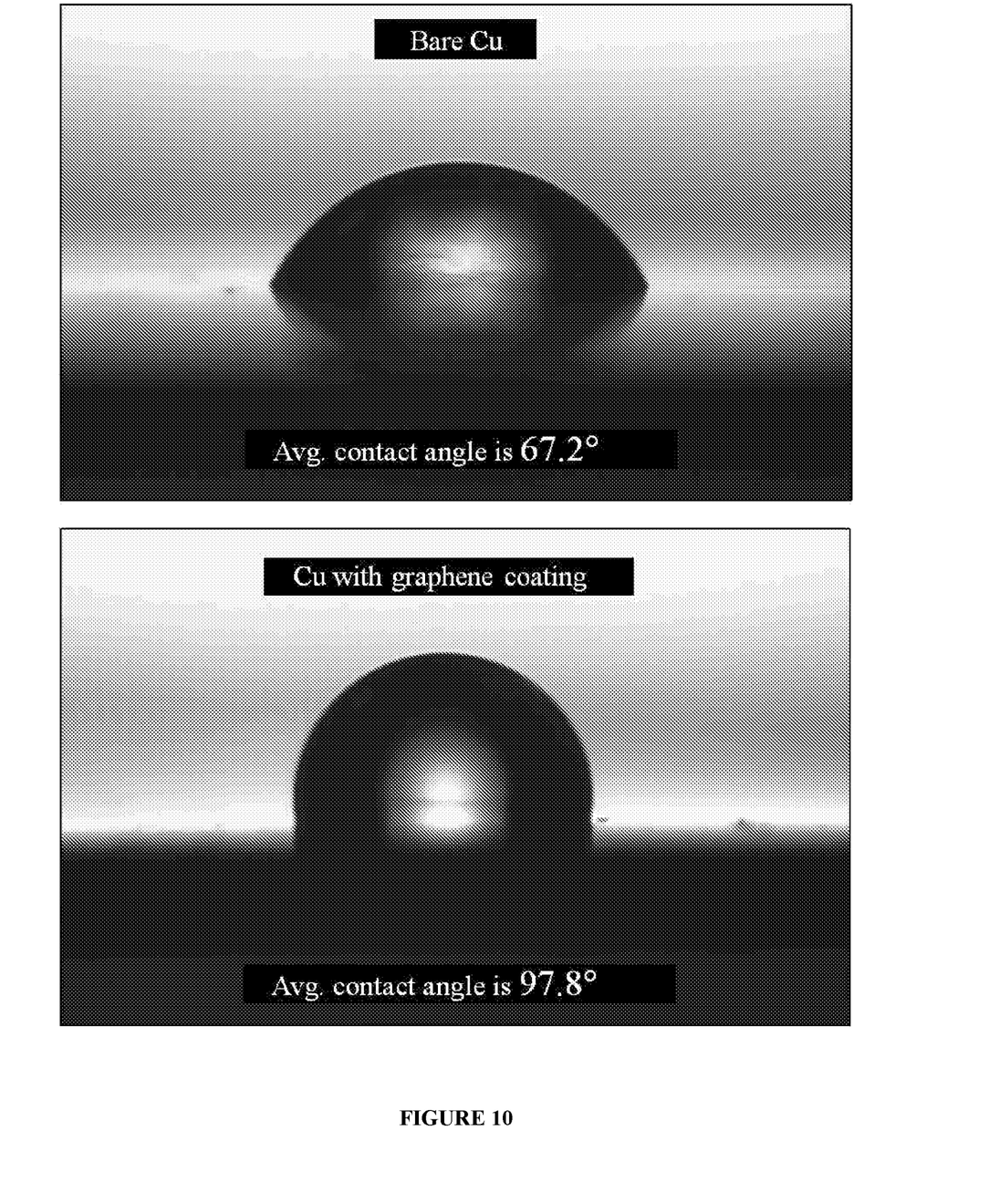
FIG. 10 illustrates water contact angle of graphene on a substrate and bare substrate (without the said graphene), respectively.

In an embodiment, FIG. 10 exemplifies the hydrophobic property of the graphene. Water contact angle of bare copper and copper having graphene is studied, wherein copper having graphene has an average water contact angle of about 97.8°, demonstrating wettability. However, bare copper has an average water contact angle of about 67.2°, demonstrating increased wettability when compared to copper having graphene.

In an embodiment, the copper having graphene has a water angle of about 92° to 97.9°. The present disclosure also relates to a substrate comprising graphene of the present disclosure, wherein the substrate is any material including but not limited to conductive material and non-conductive material.

In a non-limiting embodiment, the conductive material is selected from a group comprising, copper, nickel, aluminium, chromium, tungsten, bronze gold and alloy or any combinations thereof, and wherein the alloy is selected from a group comprising steel (SS 904), mild steel, Al—Zn alloy (Al 3003), Al—Si alloy (Al 4343), Cu—Ni and Ni—Cr, or any combinations thereof.

In another non-limiting embodiment, the non-conductive material is selected from a group comprising of glass, quartz, silica and alumina, or any combinations thereof.

In an alternate embodiment, the substrate is any material, wherein the material is oxidized, including but not limited to oxidized conductive material and oxidized non-conductive material.

In an embodiment, the substrate comprising the graphene is resistant to corrosion. FIGS. 7 and 8 exemplify the anticorrosion property of the substrate having the said graphene.

In an embodiment, FIG. 7 exemplifies the anti-corrosion property of the copper (substrate) having (coated with) graphene, wherein the copper having graphene and bare copper are exposed to dilute ferric chloride solution, respectively for about 30 minutes. Immediately after exposure, bare copper starts corroding while copper having graphene is intact without any signs of corrosion.

FIG. 8 further substantiates the anti-corrosion property of the copper (substrate) having graphene of the present disclosure. FIG. 8 exemplifies electrochemical Tafel measurement of bare copper and copper having (coated with) graphene, wherein the measurement is done with about 3.5% NaCl as electrolyte and Ag/AgCl reference electrode. Tafel result shows that the corrosion rate of the copper having graphene of the present disclosure is 0.02 mm/year (Icorr=8.62×10$^{-7}$ A/cm$^2$), whereas the corrosion rate of the bare copper is 0.26 mm/year (Icorr=1.14×10$^{-5}$ A/cm$^2$), thereby demonstrating that the substrate having graphene is resistant to corrosion.

In another embodiment, the substrate comprising graphene of the present disclosure is resistant to oxidation at temperatures ranging from about 20° C. to 250° C. for about 60 minutes exposure time. The said graphene is resistant to oxidation at about 300° C. for about 6 minutes exposure time and at about 350° C. for about 2 minutes exposure time.

In an embodiment, FIG. 9 exemplifies the oxidation resistance of the copper (substrate) having (coated with) graphene, wherein XRD measurement of bare copper and copper having graphene, respectively is performed after annealing the bare copper and copper having graphene in air at a temperature of about 250° C. for different time duration such as about 20 minutes, about 40 minutes and about 60 minutes, respectively. XRD pattern of bare copper clearly shows oxidation peak of Cu (002) whose intensity increases with increase in annealing time, while copper having graphene does not show any sign of oxidation even after annealing for about 60 minutes.

In another embodiment, the substrate comprising graphene is hydrophobic.

In an embodiment, FIG. 10 exemplifies the hydrophobic property of copper (substrate) having (coated with) graphene. Water contact angle of bare copper and copper having graphene is studied, wherein copper having graphene has an average water contact angle of about 97.8°, demonstrating reduced wettability. However, bare copper has an average water contact angle of about 67.2°, demonstrating increased wettability when compared to copper having Graphene.

Additional embodiments and features of the present disclosure will be apparent to one of ordinary skill in art based upon the description provided. The embodiments provide various features and advantageous details thereof in the description. Descriptions of well-known/conventional methods and techniques are omitted so as to not unnecessarily obscure the embodiments. The examples provided herein are intended merely to facilitate an understanding of ways in which the embodiments provided may be practiced and to further enable those of skill in the art to practice the embodiments provided. Accordingly, the following examples should not be construed as limiting the scope of the embodiments.

EXAMPLES

Example 1: Production of Graphene on Non-Conductive Material

Solution of the seedlac precursor (about 100 mg/mL) is made by adding 10 g of seedlac in isopropanol solvent of volume of about 100 ml at a temperature ranging from about 25° C. to 90° C. by gentle mixing using magnetic stirrer for about 15 minutes. Solution is kept as it is in stationary state for about 2 hours to 3 hours for settling down the contamination. The seedlac solution (about 1.5 ml) is coated over the quartz surface (2"×2") by drop casting followed by air drying at temperature of about 25° C., which acts as a feeder.

In this example the graphene is produced on non-conductive substrate material, specifically quartz substrate with seedlac precursor in the form of vapor.

The experimental setup is as described in FIG. 2 is used, wherein feeder having seedlac solution is kept away from the substrate (quartz), but in the same heating zone such that the vapor formed from the former surrounds the blank substrate, while the chamber is heated using an electro-heating furnace to temperature ranging from about 780° C. for about 15 minutes under vacuum at pressure of about 10$^{-2}$ mbar, followed by cooling the substrate to room temperature, whereby forming Graphene on the substrate. The obtained graphene is characterized by FESEM, Raman and UV-vis spectroscopy (FIGS. 3 to 5).

FIG. 3 contains optical images (a-c) and SEM (d-f) images. High resolution SEM image shown in FIG. 3(f) demonstrates that the graphene is free from structural defects. The Raman spectra data in FIG. 4 confirms the presence of graphene on the substrate. FIG. 5 shows the transmission spectrum of the graphene, with the transmission of about 88% in the visible range. The graphene is found to be conducting all over the said graphene region with $R_s$ of about 125 kΩ/sq.

Example 2: Production of Graphene on Conductive Material

Seedlac solution is prepared adding about 10 g of seedlac in isopropanol solvent of volume of about 100 ml at a temperature ranging from about 25° C. to 90° C. The resulting seedlac solution (about 1.5 ml) is coated over the surface of quartz (2"×2") followed by air drying at room temperature which acts as feeder.

In this example the graphene is produced on conductive substrate material, specifically copper substrate with seedlac precursor in the form of vapor.

The experimental setup is as described in FIG. 2, wherein feeder having seedlac precursor is kept away from the Cu substrate, but in the same heating zone such that the vapor formed from the former (feeder) surrounds the blank substrate (Cu), while the chamber is heated using an electroheating furnace in the temperature ranging from about 600° C. to 780° C. under vacuum with pressure of about $10^{-2}$ mbar for a period ranging from about 1 minute to 30 minutes, followed by cooling the substrate to room temperature, whereby forming graphene on the substrate. The graphene on Cu is characterized using Raman spectroscopy and scanning electron microscopy. FIG. 6 shows Raman spectra of Graphene on Cu substrate at different regions on the surface of the said graphene, grown at annealing temperature of about 780° C. with annealing time of about 1 minute, about 5 minute, about 15 minute and about 30 minute, respectively.

FIG. 7 exemplifies the anti-corrosion property of the copper (substrate) having (coated with) graphene, wherein the copper having graphene and bare copper are exposed to dilute ferric chloride solution, respectively for 30 minutes. Immediately after exposure, bare copper starts corroding while copper having graphene was intact without any signs of corrosion.

FIG. 8 further substantiates the anti-corrosion property of the copper (substrate) having graphene of the present disclosure. FIG. 8 exemplifies electrochemical Tafel measurement of bare copper and copper having (coated with) graphene, wherein the measurement is done with about 3.5% NaCl as electrolyte and Ag/AgCl reference electrode. Tafel result shows that the corrosion rate of the copper having graphene of the present disclosure is 0.02 mm/year (Icorr=$8.62\times10^{-7}$ A/cm$^2$), whereas the corrosion rate of the bare copper is 0.26 mm/year (Icorr=$1.14\times10^{-5}$ A/cm$^2$), thereby demonstrating that the substrate having graphene is resistant to corrosion.

FIG. 9 exemplifies the oxidation resistance of the copper (substrate) having (coated with) graphene, wherein XRD measurement of bare copper and copper having graphene, respectively is performed after annealing the bare copper and copper having graphene in air at a temperature of about 250° C. for different time duration of about 20 minutes, about 40 minutes and about 60 minutes, respectively. XRD pattern of bare copper clearly shows oxidation peak of Cu (002) whose intensity increases with increase in annealing time, while copper having graphene does not show any sign of oxidation even after annealing for about 60 minutes. FIG. 10 exemplifies the hydrophobic property of copper (substrate) having (coated with) graphene. Water contact angle of bare copper and copper having graphene is studied, wherein copper having graphene has an average water contact angle of about 97.8°, demonstrating reduced wettability. However, bare copper has an average water contact angle of about 67.2°, demonstrating increased wettability when compared to copper having Graphene.

Example 3: Production of Graphene on Conductive Material

Seedlac solution is prepared by adding about 10 g of seedlac in isopropanol solvent of volume of about 100 ml at a temperature ranging from about 25° C. to 90° C. The resulting seedlac solution (about 1.5 ml) is coated over the surface of quartz (2"×2") followed by air drying at room temperature which acts as feeder.

In this example, the graphene is produced on conductive substrate material, specifically Aluminum substrate with seedlac precursor in the form of vapor.

Figure 11:
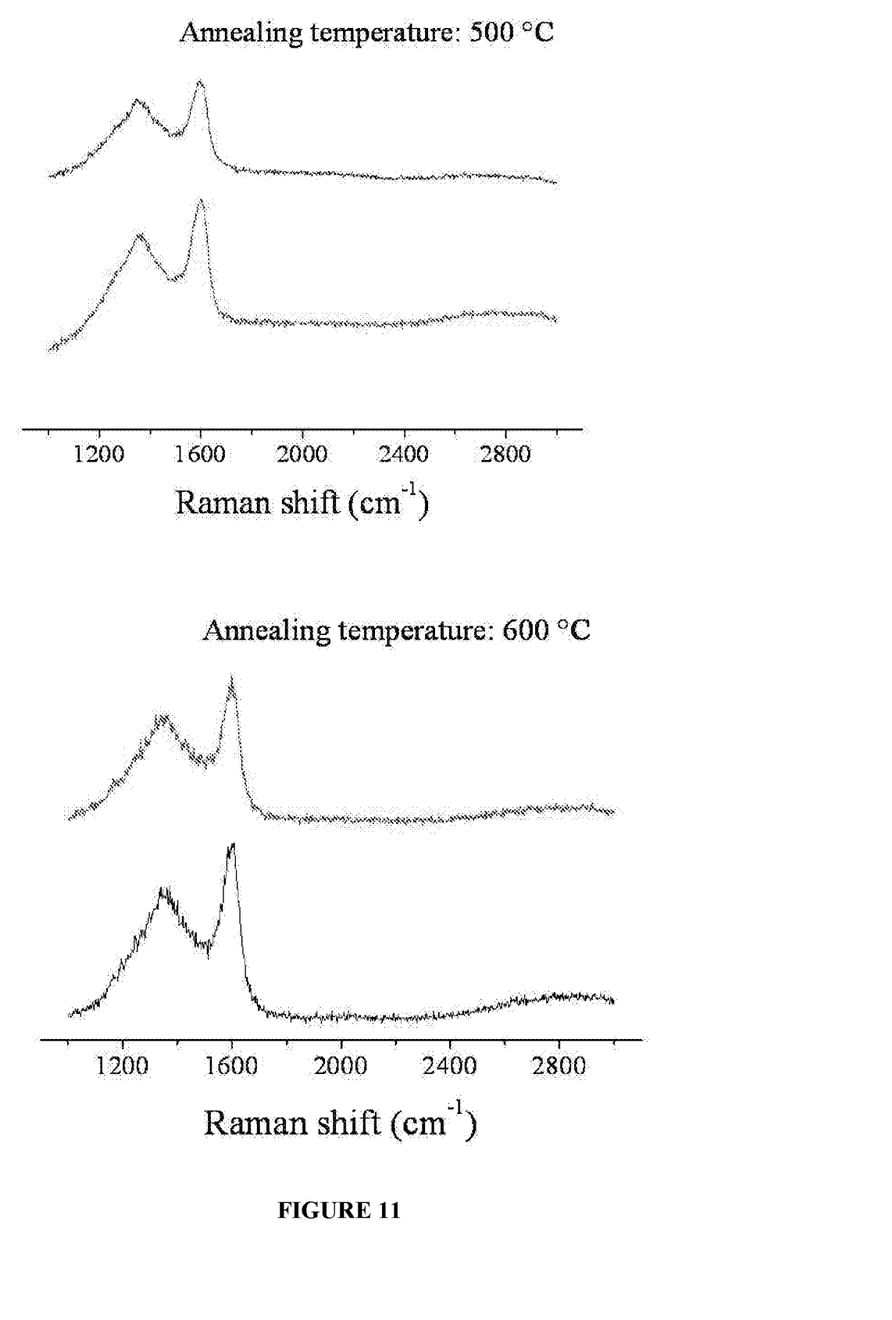
FIG. 11 illustrates Raman spectra of graphene at different regions of the said graphene, wherein the graphene is formed on the substrate at various annealing temperatures for about 15 minutes, respectively.

The experimental setup is as described in FIG. 2, wherein feeder having seedlac precursor is kept away from the Al substrate, but in the same heating zone such that the vapor formed from the former (feeder) surrounds the blank substrate (Al), while the chamber is heated using an electroheating furnace in the temperature ranging from about 500° C. to 650° C. under vacuum with pressure of about $10^{-2}$ mbar for a period of about 15 minutes, followed by cooling the substrate to room temperature, whereby forming graphene on the substrate. The graphene on Al is characterized using Raman spectroscopy. FIG. 11 shows Raman spectra of graphene on Al substrate at different regions on the substrate, grown at different annealing temperatures of about 600° C. and about 500° C., respectively.

Additional embodiments and features of the present disclosure is apparent to one of ordinary skill in art based on the description provided herein. The embodiments herein provide various features and advantageous details thereof in the description. Descriptions of well-known/conventional methods and techniques are omitted so as to not unnecessarily obscure the embodiments herein. The foregoing description of the specific embodiments fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments in this disclosure have been described in terms of preferred embodiments, those skilled in the art will recognize that the embodiments herein can be practiced with modification within the spirit and scope of the embodiments as described herein. Throughout this specification, the word "comprise", or variations such as "comprises" or "comprising" wherever used, will be understood to imply the inclusion of a stated element, integer or step, or group of elements, integers or steps, but not the exclusion of any other element, integer or step, or group of elements, integers or steps. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The use of the expression "at least" or "at least one" suggests the use of one or more elements or ingredients or quantities, as the use may be in the embodiment of the disclosure to achieve one or more of the desired objects or results. Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application. While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

We claim:

1. A process for producing graphene, wherein said process comprises steps of: heating substrate and at least one feeder comprising seedlac, followed by contacting vapours of seedlac with the substrate; and cooling to produce the graphene, wherein the heating causes the seedlac to vaporize and contact the substrate.

2. The process as claimed in claim 1, wherein the substrate and the at least one feeder is heated to a temperature ranging from about 400° C. to 1200° C. under vacuum at a pressure ranging from about $10^{-1}$ mbar to $10^{-5}$ mbar for time period ranging from about 1 minute to 120 minutes or under controlled atmosphere comprising argon, nitrogen and hydrogen, or any combinations thereof, having flow rate ranging from about 100 sccm to 500 sccm for a time period ranging from about 1 minute to 120 minutes.

3. The process as claimed in claim 1, wherein the substrate is selected from a group comprising conductive material and non-conductive material, or a combination thereof; and wherein the substrate is in a form selected from a group comprising sheet, wire, foil and mesh, or any combinations thereof.

4. The process as claimed in claim 3, wherein the conductive material is selected from a group comprising nickel, copper, aluminum, chromium, tungsten, bronze gold and alloy or any combinations thereof, and wherein the alloy is selected from a group comprising steel (SS 904), mild steel, Al—Zn alloy (Al 3003) Al—Si alloy (Al 4343), Cu— Ni and Ni—Cr, or any combinations thereof; and wherein the non-conductive material is selected from a group comprising glass and quartz, or a combination thereof.

5. The process as claimed in claim 1, wherein the feeder comprises the seedlac at a concentration ranging from about 10 g/l to 200 g/l; wherein the feeder is identical or different from the substrate; and wherein the feeder is selected from a group comprising quartz, alumina and ceramic, or any combinations thereof.

6. The process as claimed in claim 1, wherein the seedlac is in solution form, casted on the feeder by technique selected from a group comprising spin coating, dipping, spraying, bar coating, slot coating and drop casting or any combinations thereof, followed by drying the feeder comprising the seedlac in air atmospheric pressure for a time period ranging from about 1 minute to 10 minutes.

7. The process as claimed in claim 1, wherein the cooling is carried out a temperature ranging from about 25° C. to 50° C.

8. A graphene produced by the process as claimed in claim 1, wherein the graphene is impermeable, resistant to oxidation and hydrophobic, wherein the graphene is formed from the vapours of seedlac.

9. The graphene as claimed in claim 8, wherein the graphene has a thickness ranging from about 1 nm to 10 nm.

10. A substrate comprising the graphene produced by the process as claimed in claim 1, wherein the graphene is formed from the vapours of seedlac.

11. The substrate as claimed in claim 10, wherein the substrate is resistant to corrosion, resistant to oxidation and is hydrophobic.

12. The substrate as claimed in claim 10, wherein the substrate is selected from a group comprising conductive material and non-conductive material, or a combination thereof and wherein the substrate is in a form selected from a group comprising sheet, wire, foil and mesh, or any combinations thereof.

13. The substrate as claimed in claim 12, wherein the conductive material is selected from a group comprising nickel, copper, aluminum, chromium, tungsten, bronze gold and alloys or any combinations thereof, and wherein the alloy is selected from a group comprising steel (SS 904), mild steel, Al—Zn alloy (Al 3003) Al—Si alloy (Al 4343), Cu— Ni and Ni—Cr, or any combinations thereof; and wherein the non-conductive material is selected from a group comprising glass and quartz, or a combination thereof.

14. The substrate as claimed in claim 10, wherein the substrate has a corrosion rate of about 0.02 mm/year; and wherein the substrate has an average water contact angle of about 92° to 97.9°.

* * * * *